United States Patent
Deng et al.

(10) Patent No.: US 8,054,335 B2
(45) Date of Patent: Nov. 8, 2011

(54) METHODS AND SYSTEM FOR DIGITALLY STABILIZING VIDEO CAPTURED FROM ROLLING SHUTTER CAMERAS

(75) Inventors: Yining Deng, Fremont, CA (US); D. Amnon Silverstein, Mountain View, CA (US)

(73) Assignee: Aptina Imaging Corporation, George Town (KY)

( * ) Notice: Subject to any disclaimer, the term of this patent is extended or adjusted under 35 U.S.C. 154(b) by 921 days.

(21) Appl. No.: 12/004,056

(22) Filed: Dec. 20, 2007

(65) Prior Publication Data

US 2009/0160957 A1 Jun. 25, 2009

(51) Int. Cl.
*H04N 5/228* (2006.01)
(52) U.S. Cl. .................................................. 348/208.1
(58) Field of Classification Search ............. 348/208.99; 396/55
See application file for complete search history.

(56) References Cited

U.S. PATENT DOCUMENTS

| | | | |
|---|---|---|---|
| 5,748,231 A | 5/1998 | Park et al. | |
| 6,809,758 B1 | 10/2004 | Jones | |
| 7,085,637 B2 | 8/2006 | Breed et al. | |
| 7,564,482 B2* | 7/2009 | Clarke et al. | 348/208.1 |
| 7,924,317 B2* | 4/2011 | Lin | 348/208.4 |
| 2004/0001147 A1 | 1/2004 | Vella et al. | |
| 2004/0100560 A1 | 5/2004 | Stavely et al. | |
| 2005/0179784 A1 | 8/2005 | Qi | |
| 2006/0140602 A1* | 6/2006 | Kurata et al. | 396/55 |
| 2006/0170784 A1* | 8/2006 | Clarke et al. | 348/208.99 |
| 2007/0165123 A1 | 7/2007 | Panicacci | |
| 2008/0030587 A1* | 2/2008 | Helbing | 348/208.4 |
| 2009/0201383 A1* | 8/2009 | Slavin | 348/222.1 |
| 2009/0231446 A1* | 9/2009 | Lin | 348/208.4 |

FOREIGN PATENT DOCUMENTS

| | | |
|---|---|---|
| WO | WO2006/124237 A2 | 11/2006 |
| WO | WO2007/081743 A2 | 7/2007 |

OTHER PUBLICATIONS

Im, Jeong-A, et al.; Digital Video Stabilization Algorith for CMOS Image Sensor; Oct. 2006; 2006 IEEE International Conference on Image Processing; pp. 3261-3264.*

* cited by examiner

*Primary Examiner* — Jason Chan
*Assistant Examiner* — Gary C Vieaux

(57) ABSTRACT

An imaging device and methods of stabilizing video captured using a rolling shutter operation. Motion estimation is used to determine a row motion vector for individual rows of a current frame of a pixel array. The row motion vectors are used to map the location of pixels in the current frame to a mapped frame representing a single acquisition time for the current frame.

10 Claims, 19 Drawing Sheets

METHODS AND SYSTEM FOR DIGITALLY STABILIZING VIDEO CAPTURED FROM ROLLING SHUTTER CAMERAS

FIELD OF THE INVENTION

Embodiments of the invention relate to video stabilization in digital cameras, and more specifically to video stabilization in rolling shutter video cameras.

BACKGROUND OF THE INVENTION

An unstabilized video camera often produces a video image that bounces and jerks according to the movement of the camera user during filming. In order to remedy this normally undesirable result, digital video stabilization is used as a low-cost alternative to optical stabilization, removing video "jitter" through image post-processing, thus making the video appear as if the camera had been stabilized during use. Although many video stabilization techniques have been proposed and are currently used with charge-coupled device (CCD) imaging devices, very few techniques have been proposed for use with complementary metal oxide semiconductor (CMOS) imaging devices, such as those widely used in digital cameras and camera phones.

Many CMOS imaging devices acquire digital images using a rolling shutter mechanism. In a rolling shutter device, a pixel array is incrementally exposed to light from an image, row-by-row. For example, the top or first row in the pixel array may be exposed first to light from an image. Soon thereafter, the second row is exposed, followed by the third row, and so forth. Each pixel row has a same total exposure time, but each row begins its exposure time (and hence also ends its exposure time) at different times. Most significantly, there is a significant delay between the moment the first row is exposed to light and the moment the last or bottom row is exposed to light. The result of this delay is a rolling shutter artifact that appears in an acquired image when either the camera or the viewed object moves during the course of the rolling exposure, as illustrated in FIGS. 1A-1E.

FIG. 1A depicts an image 5 as it would appear if the object depicted in the image 5 and the camera taking the image 5 were both not moving. The image 5 appears to be very much like the actual object captured by the image 5. However, if either the camera pans to the left or the object moves to the right during a rolling shutter exposure, the image 5 appears distorted, as seen in FIG. 1B. The rolling shutter results in different portions of the object being acquired for the image 5 at different times. The movement of the object during the exposure time results in some portions of the object appearing to move ahead of other portions of the object. In the example depicted in FIG. 1B, the camera panning to the left or the object moving to the right results in the bottom portion of the object appearing to move further to the right than the top portion of the object in the image 5, because the bottom portion is exposed at a later time than the top portion. Similarly, in FIG. 1C, when the camera pans to the right or the object moves to the left, the bottom portion of the object appears to move further to the left than the top portion of the object. In FIG. 1D, when the camera tilts upward or the object moves downward, the object in the image 5 appears to stretch. When the camera tilts downward or the object moves upward, the object appears to shrink in the image 5, as depicted in FIG. 1E.

The above-described rolling shutter artifacts are especially noticeable when conventional video stabilization techniques are applied to captured video. Even after the video has been stabilized, meaning that the up and down, side-to-side or rotational movements of an unstabilized camera have been compensated for, the distortion caused by the rolling shutter is still apparent. Camera movements from side to side result in the filmed object appearing to wobble instead of standing still, even after video stabilization. Up and down movements of the camera result in the continuous stretching and shrinking of the filmed object. Thus, video stabilization for a rolling shutter video requires both removal of the rolling shutter artifacts as well as the application of video stabilization techniques.

One technique for stabilizing rolling shutter video uses a 3×3 transformation matrix to model the image relationship between a rolling shutter image and a non-rolling shutter image. The transformation matrix is used to transform the acquired rolling shutter image to an equivalent non-rolling shutter image. Afterwards, camera motion is smoothed. Unfortunately, the 3×3 transformation matrix/model makes two critical assumptions that often are not correct. First, the model assumes that image differences between two consecutive frames are the result of a simple translation in x and y coordinates. The model ignores rotational movement. Additionally, the model assumes that any translational motion is uniform from the time that the top row is captured to the time the bottom row is captured. However, motion tends to change abruptly from frame to frame as well as during frame acquisition. Thus, although the assumptions used in the translation model are indeed rough approximations of actual camera or object movement, the approximations are not always valid, and thus do not fully compensate for the rolling shutter artifacts in video.

DETAILED DESCRIPTION OF THE INVENTION

Figure 2:
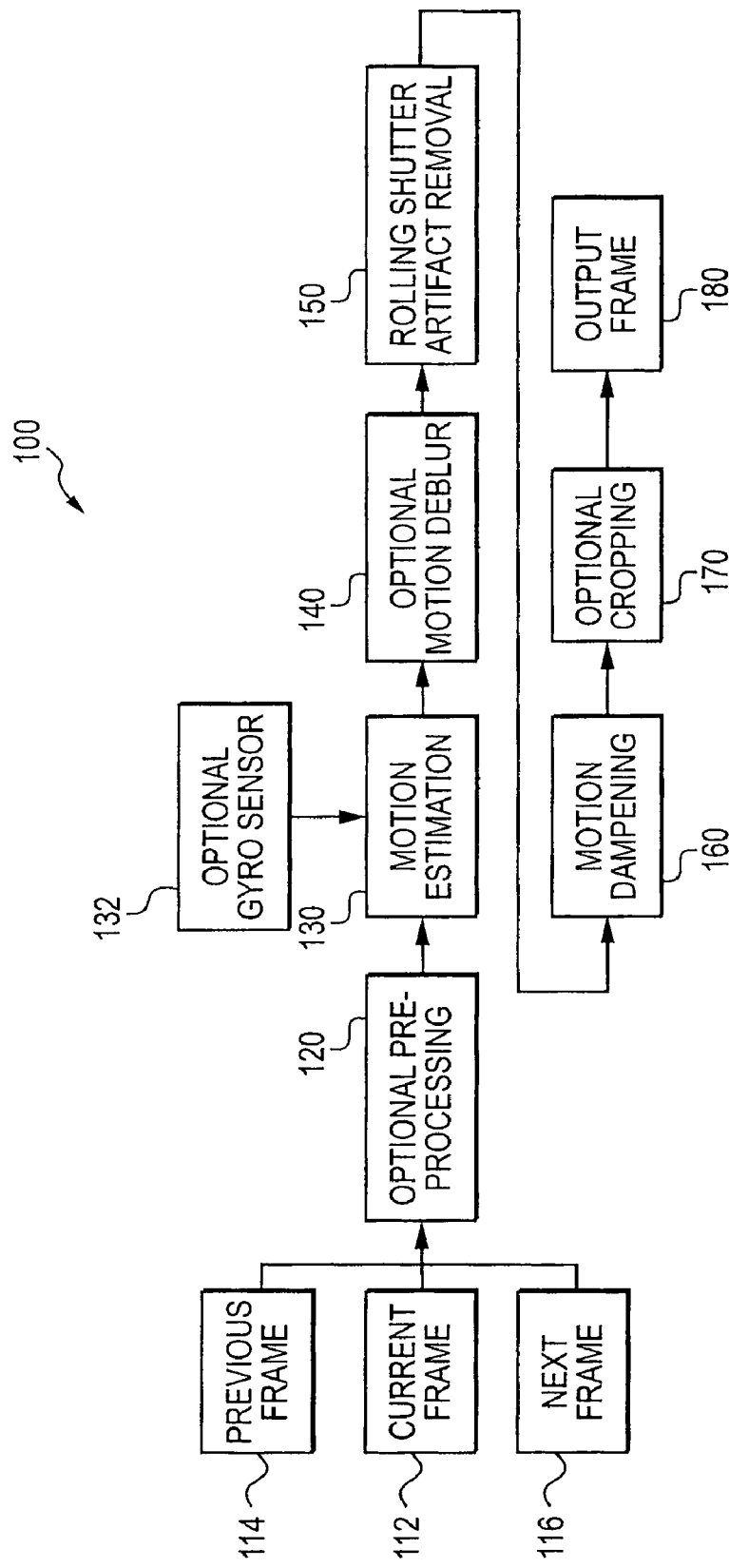
FIG. 2 is a block diagram of a motion stabilization system according to a disclosed embodiment.

Video captured using rolling shutter CMOS cameras may be stabilized using the system 100 illustrated in FIG. 2. In FIG. 2, stabilization system 100 includes inputs from a current video frame 112 as well as from a previous video frame 114 and a next frame 116. The current frame is optionally subjected to pre-processing 120, which generally includes noise removal and sharpening of the image. Noise removal and sharpening methods are generally well-known in the art. Examples of noise removal methods include the use of smoothing methods (for example, replacing a pixel's value with an average of the pixel's neighboring pixel values). Examples of sharpening methods include utilizing an unsharp masking filter to increase image contrast near object edges. After the optional pre-processing phase, the current video frame 112 is subjected to a motion estimation analysis 130. During motion estimation, the current video frame 112 is matched with the previous video frame 114 and/or the next video frame 116, both of which may also be subjected to the optional pre-processing phase, to determine how the camera is being moved (e.g., to identify camera jitter). Several low memory cost motion estimation methods are described below in detail. A gyro sensor 132 may optionally be used to assist in the detection and measuring of camera motion and thus improve the accuracy of the motion estimation step 130.

A motion deblur step 140 is optionally applied to the current video frame after the motion estimation analysis 130. Motion deblur is used to reduce artifacts that are potentially still visible even after video stabilization. Without correction, severe motion blur may still result in a scene appearing to pulsate between sharp and blurry conditions even after video stabilization. The motion deblur step 140 can alleviate this problem. Motion deblur methods are generally well-known, any of which can be used at step 140. Examples of motion deblurring methods include fast fourier transform deblurring, Weiner deblurring and Lucy-Richardson deblurring, among many other methods.

Using the motion information generated in the motion estimation phase 130, the system 100 removes artifacts caused by a rolling shutter camera (step 150), as explained in detail below. The resulting video output of the rolling shutter artifact removal stage 150 resembles an output of a non-rolling shutter CCD camera. At this point, traditional video stabilization techniques such as those normally applied in non-rolling shutter cameras may be applied. For example, motion dampening 160 may be used to smooth high-frequency jitter motion but maintain low-frequency movements that would generally be the result of the video motion trajectory, the plot of a scene location over a sequence of frames. Motion dampening can produce a stabilized video output via the use of, among other methods, high-frequency filters.

The stabilized video output is optionally cropped (step 170) to remove any void or unnecessary image areas created after the video frame is motion compensated. Any cropping technique may be used at step 170. The cropped video is output as an output frame 180.

Techniques of frame pre-processing (step 120), motion deblur (step 140), motion dampening (step 160) and output video cropping (step 170) are well-known in the art. The example methods identified above represent only a small subset of the available methods. Accordingly, the description below will focus on the steps of motion estimation (step 130) and rolling shutter artifact removal (step 150) according to embodiments of the invention.

Figure 1E:
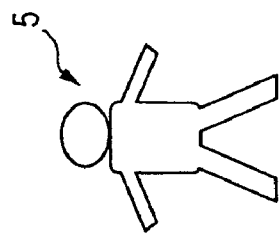
FIGS. 1A-1E are illustrations of rolling shutter video artifacts.
Figure 1D:
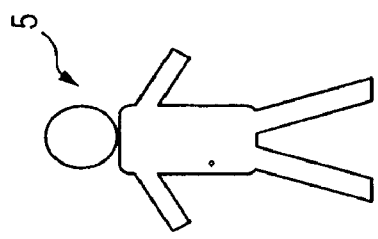
Figure 1C:
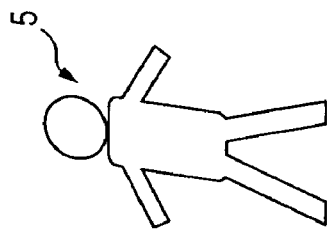
Figure 1B:
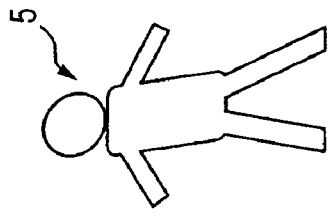
Figure 1A:
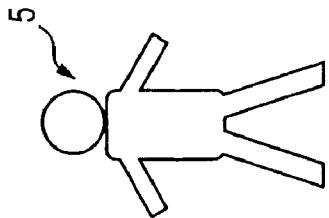

Traditional motion estimation techniques reported in the literature generally attempt to estimate motion at the frame-, block- or even pixel-level. Motion estimation at any level is generally carried out by identifying features within an image and tracking the feature movement in the image across multiple frames. Thus, for example, in FIG. 1B where either the camera is panning to the left or the imaged object is moving to the right, by tracking the motion of object features (e.g., a foot, a head, etc.), the camera motion or object motion can be determined. The motion is described as a motion vector. In non-rolling shutter cameras, frame-level motion estimation is often sufficient, thus generating a single frame motion vector. For example, if a camera is panning across a scene and the scene depth is the same for all imaging pixels, the motion vectors describing the motion of objects at the pixel level (i.e., pixel motion vectors) should be identical to each other. Because each pixel motion vector is identical, only one global motion vector is needed to describe the frame shift. However, in rolling shutter cameras, the image is captured by different rows at different times, meaning that the motion vectors of pixels within different rows could be different if, for example, the camera panning is non-uniform. Accordingly, in a rolling shutter camera, and in system 100, motion vectors are generated for rows of pixels, one row at a time and row-by-row.

Figure 3:
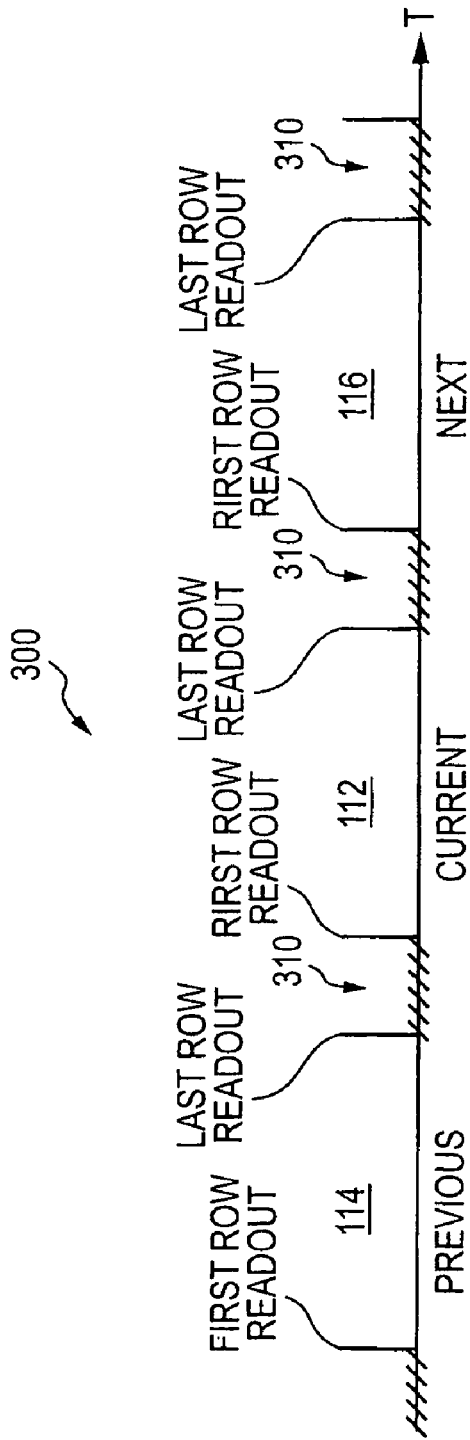
FIG. 3 is an illustration of a rolling shutter camera timeline according to a disclosed embodiment.

Row-by-row motion vector generation is advantageous for rolling shutter cameras, as explained in reference to FIG. 3. FIG. 3 illustrates a timeline 300 for frame capture in a rolling shutter camera. During frame capture, the first row of pixels in the image is read by a camera sensor, followed by the next row, and the next, until the final row is read. After an entire frame has been read, a blanking period 310 occurs. The blanking period 310 is followed by the initial reading (i.e., the reading of the top row) of the next frame. During the read-out period, a motion vector for a specific row in the image is generated. For example, a motion vector for the first row in an image may be generated by matching the first row of the current frame 112 with the location of the first row image in the previous frame 114 and in the next frame 116. However, determining row motion vectors by matching only one row of pixels generally results in inaccurate motion vectors due to the failure to consider pixels in the vertical direction.

Figure 4B:
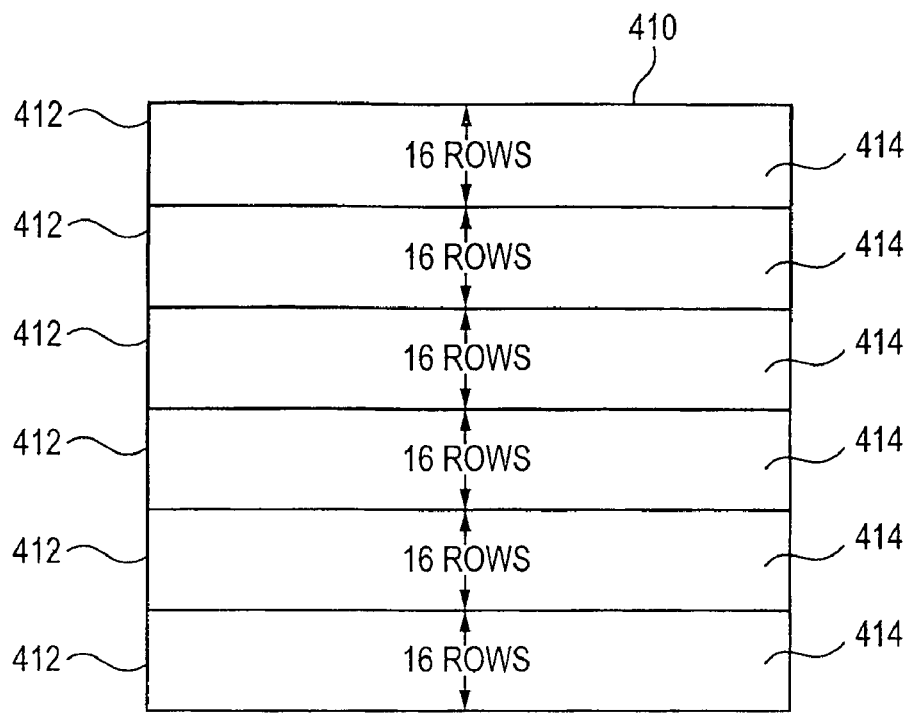
FIGS. 4A and 4B are illustrations of a video frame divided into strips according to a disclosed embodiment.
Figure 4A:
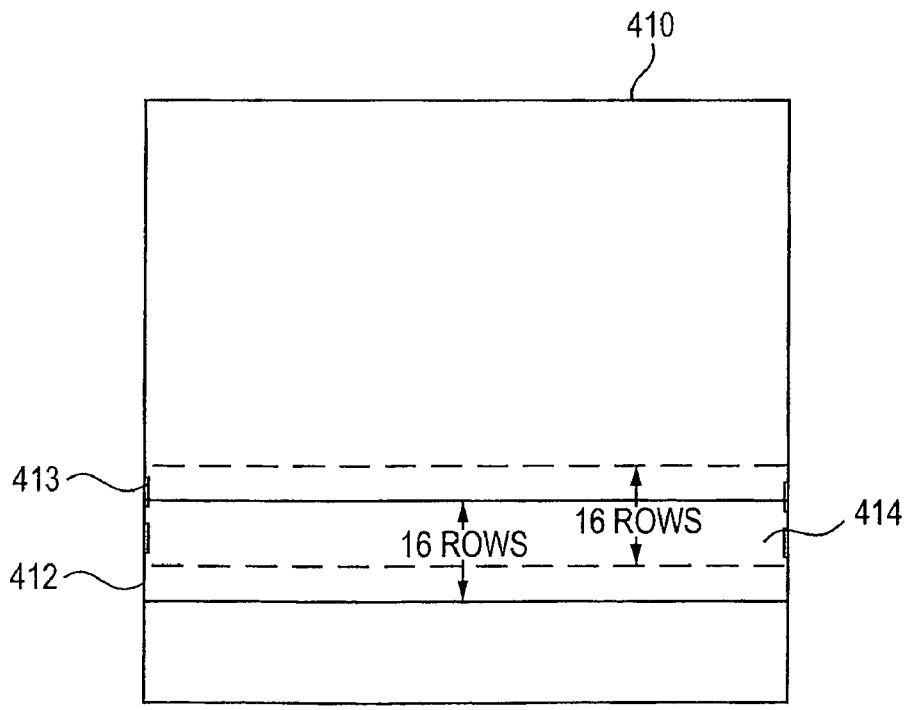

In order to avoid these inaccuracies, in one embodiment, more than one pixel row at a time is used in motion matching. For example, a strip 412 of pixels that includes several rows may be used for motion matching, as illustrated in the frame 410 of FIG. 4A. A motion vector may be determined, as explained below, for an entire strip 412 of pixel rows. The resulting strip motion vector is used as the row motion vector for the middle row(s) 414 of the strip. The motion vectors for other rows in the frame 410 are obtained by shifting a strip 413 up and/or down and re-calculating the strip motion vector. Alternatively, other row motion vectors may be determined, as illustrated in FIG. 4B, by dividing the frame 410 into strips 412, calculating a strip motion vector for each strip 412, applying the calculated strip motion vectors to the row motion vectors for the middle row(s) of each strip 414, and then interpolating the row motion vectors of other rows by using the row motion vectors closest to the row whose row motion vector is to be determined. The latter approach divides the frame 410 into multiple strips 412. For easier hardware implementation, each strip can be 8 pixels or 16 pixels in height. Motion vectors for each strip are estimated and row motion vectors are then interpolated from the strip motion vectors. Strip motion vectors may be obtained using several speed efficient and low memory cost methods, as explained below.

Figure 5:
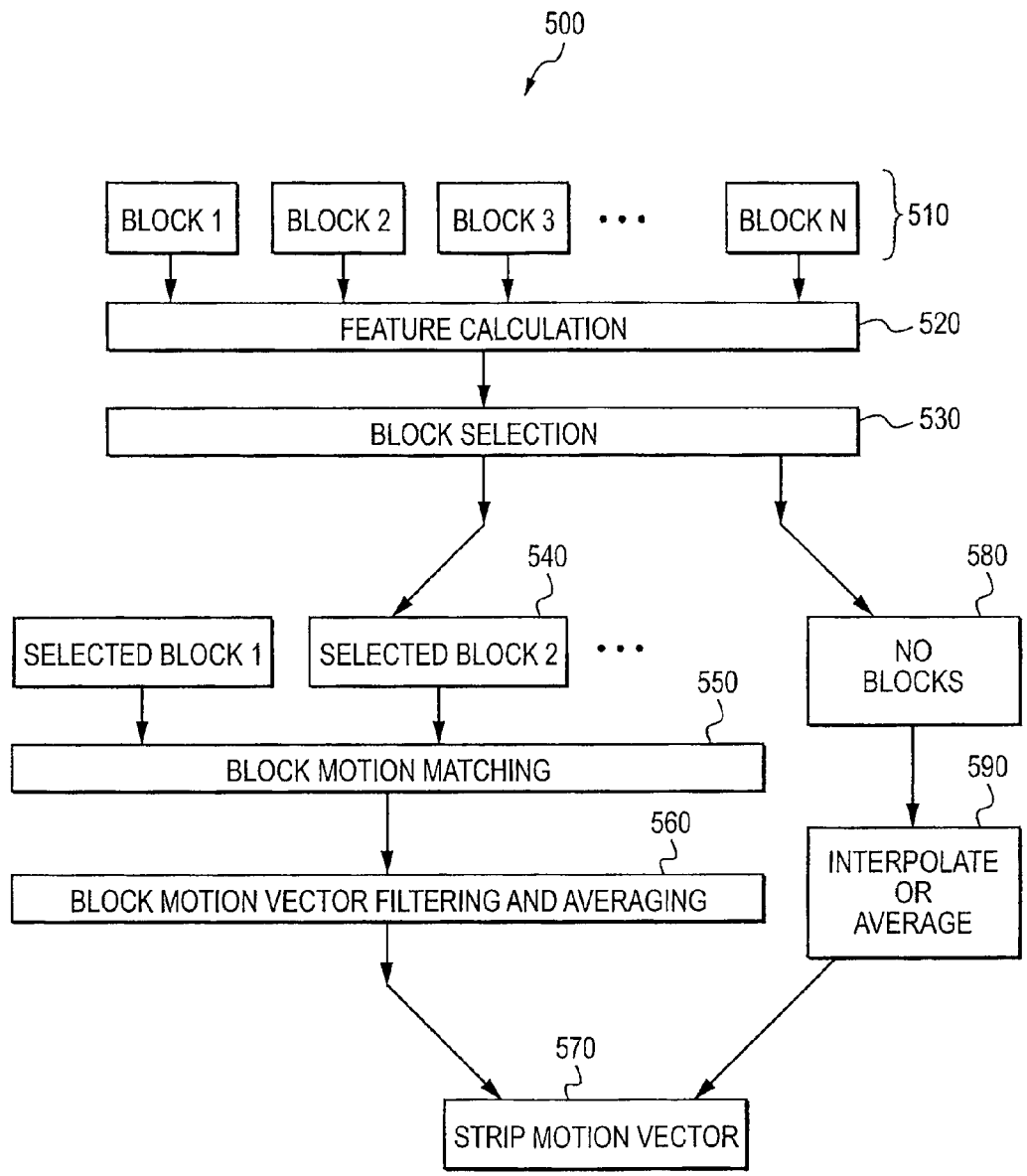
FIG. 5 is flowchart illustrating a method of calculating a strip motion vector according to a disclosed embodiment.

A basic method 500 is illustrated in FIG. 5 for generating strip motion vectors and requires dividing each strip into blocks 1-N (step 510), wherein the blocks are used for motion matching. Typical block sizes can be 8×8 or 16×16. Generally, blocks containing corners of objects in the imaged scene tend to give more accurate motion vectors. For this reason, blocks are analyzed to determine if the blocks have a high probability of including high-contrast features such as corners of the imaged object (step 520). In one implementation, the variances of each block along horizontal, vertical, and diagonal directions are calculated in order to determine if a block includes an edge or some other high-contrast texture. The term variance is used to describe the overall change of pixel values or groups of pixels from the mean pixel value or group of pixels for each block. Variances in the horizontal direction compare the values of pixel columns. Vertical variance compares the values of pixel rows. Diagonal variances compare the values of pixels in the diagonal directions. Variances across portions of each block may also be calculated in order to provide a greater resolution of the block's features. Generally, blocks with higher variances along all four directions have a higher probability of being corner blocks. The blocks with higher variances are selected (step 530). The process of block selection (step 530) is described in detail below.

The selected blocks 540 are used in motion matching (step 550). Unselected blocks are discarded. Many different motion matching techniques may be used. In one implementation, a simple full search block motion matching algorithm is used, as is known in the art. In a block motion matching algorithm, selected blocks are analyzed for feature characterization by using the previously determined variances across the blocks in multiple directions. Using the variances to characterize each block, matching blocks are sought among either previous or next frames. The search area may be a limited area within each frame, or it may include the entire frame. When a match is found, a motion vector for the block may be calculated (step 560). After the block motion vectors have been calculated, the block motion vectors in the strip are averaged to obtain the strip motion vector 570. Alternatively, the median of the block motion vectors may be calculated and then the strip motion vector 570 is determined by averaging the block motion vectors with values near the median block motion vector (step 560). This second approach is particularly useful when the block motion vectors are noisy.

Sometimes, no corner blocks can be found in a strip or no reliable block motion vectors can be found (step 580) during block selection (step 530). In these cases, the strip motion vector is calculated in some other manner (step 590). For example, the strip motion vector may be interpolated from the block motion vectors of neighboring strips. Alternatively, the strip motion vector may be assigned as the average of all strip motion vectors in the frame.

The basic method 500 described above requires several line buffers to store the strip for processing. The memory cost for the basic method may be too high for some applications. Accordingly, additional approaches are described below which further reduce the memory cost for determining strip motion vectors.

Figure 6A:
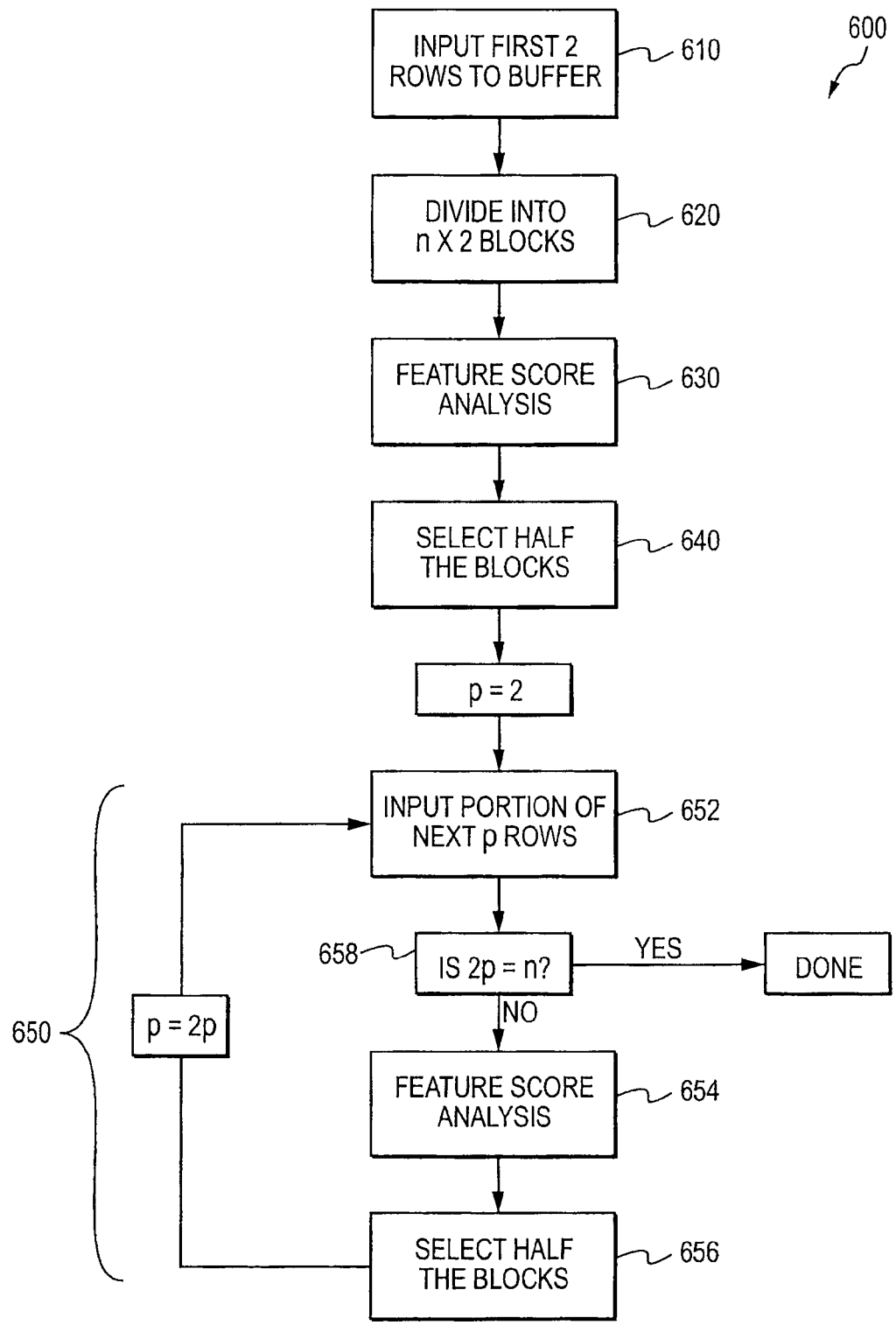
FIGS. 6A-6C are flowcharts illustrating a method of selecting pixel blocks according to a disclosed embodiment.
Figure 6B:
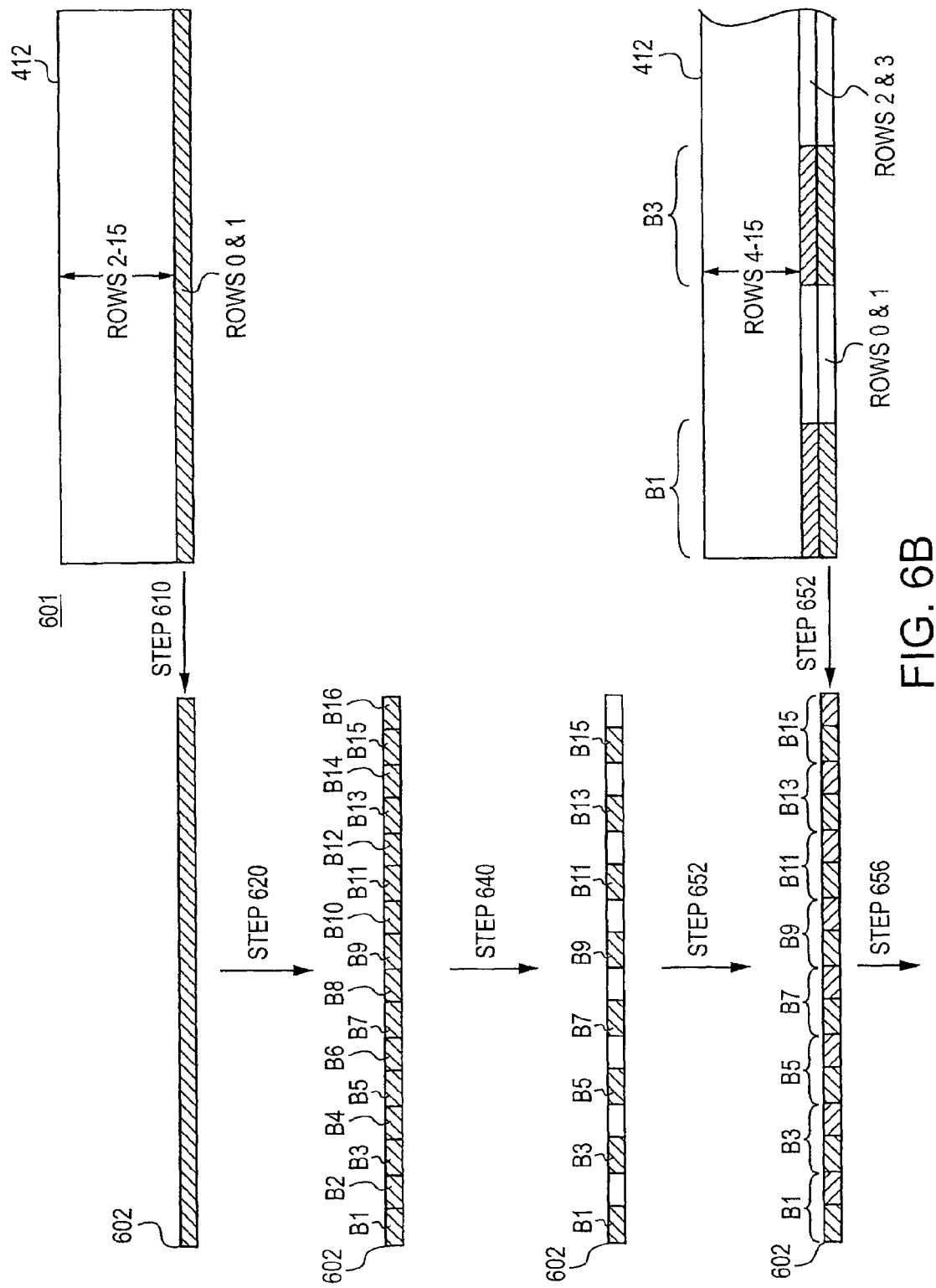
Figure 6C:
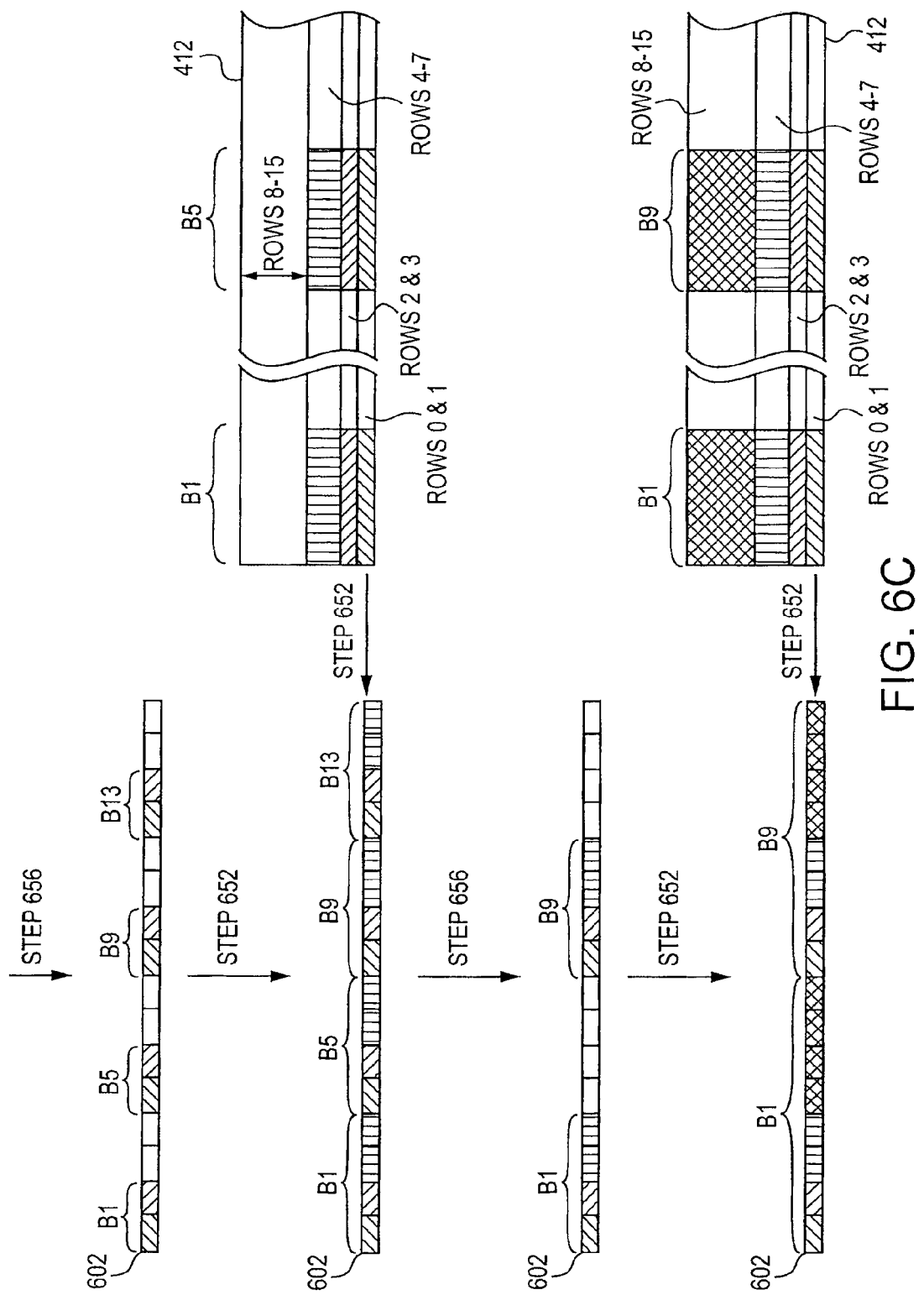

In one method 600, illustrated in FIG. 6A, and example 601, illustrated in FIGS. 6B and 6C, only a single two-line buffer is required. In the explanation that follows, and for ease of illustration, each strip includes sixteen rows (i.e., the strip height is 16). However, the method 600 is not limited to use with strips of only 16 rows.

In order to find corner blocks and calculate a motion vector for those corner blocks, the first two rows (Rows 0 and 1) of a strip 412 are input to a line buffer memory 602 (step 610). The line buffer memory 602 is divided into 16×2 blocks B1-B16 (step 620). In general, if strips 412 consist of n rows, the line buffer memory 602 is divided into n×2 blocks B1-B16. In the illustration of FIG. 6B, the line buffer memory 602 is divided into 16 blocks B1-B16, meaning that each row of strip 412 is 16×16 pixels (256 pixels). However, in practice, the line buffer memory 602 is divided into as many n×2 blocks as possible. In the case where there are 16 lines per strip 412, as illustrated in FIG. 6B, the 16×2 blocks B1-B16 are each analyzed to determine if the blocks B1-B16 might include a corner. Simple horizontal variance is used to analyze the features across each block B1-B16 (vertical variance is generally not practical with each block B1-B16 having only two pixels in the vertical direction). As a result of the analysis, the blocks B1-B16 are assigned feature scores (step 630). The half of the blocks B1, B3, B5, B7, B9, B11, B13, B15 that have feature scores greater than the feature scores of the remaining half of the blocks B2, B4, B6, B8, B10, B12, B14, B16 are selected, while the lower-scoring half of blocks B2, B4, B6, B8, B10, B12, B14, B16 are discarded (step 640). The discarding of the lower-scoring blocks B2, B4, B6, B8, B10, B12, B14, B16 frees half of the capacity in the line buffer memory 602.

It is to be noted that although the illustration of FIG. 6B demonstrates that every other block B1, B3, B5, B7, B9, B11, B13, B15 may be selected as having higher feature scores than the unselected blocks B2, B4, B6, B8, B10, B12, B14, B16, such regular patterns are not required or even expected. Method 600 requires only that any half of the blocks B1-B16 are selected while the other half are not. For example, if blocks B1-B8 each had higher feature scores than blocks B9-B16, then blocks B1-B8 would have been selected and blocks B9-B16 would have been discarded. The end result is that the line buffer memory 602 is still only half full. In the example of FIG. 6B, after a first round of selection and discarding, the line buffer memory 602 includes only 8 16×2 blocks and now has capacity for additional data.

The additional data is input during loop 650, where p is a multiplier. Those portions of the next two rows (Rows 2 and 3) of the strip 412 that correspond with the selected blocks B1, B3, B5, B7, B9, B11, B13, B15 in the line buffer 602 are then input to the line buffer 602 (step 652). In the illustrated example of FIG. 6B, the line buffer 602 now includes 16×4 blocks B1, B3, B5, B7, B9, B11, B13, B15 from the strip 412. However, the 16×4 blocks are distributed throughout the line buffer 602 as pairs of 16×2 blocks. In FIG. 6B, the blocks B1, B3, B5, B7, B9, B11, B13, B15 are organized as adjacent pairs of 16×2 blocks. However, the pairs need not be adjacent as long as the pairs are treated as a single 16×4 block for analysis purposes. As explained below, non-adjacent pairs may be shuffled within the line buffer 602 so as to be adjacent. Alternatively, look-up tables or other data-tracking systems may be used to keep track of the location of each pair in the line buffer 602.

Returning again to method 600 (FIG. 6A), as long as the block height is less than the strip height (as long as 2p is less than n (step 658)), the process continues (step 658). The line buffer is then divided into 16×4 blocks B1, B3, B5, B7, B9, B11, B13, B15 (formed by pairs of 16×2 blocks), or, in the generic case when the step height is n, 16×2p blocks (step 654). A feature analysis is performed on the 16×4 blocks B1, B3, B5, B7, B9, B11, B13, B15, and the half of the blocks B1, B5, B9, B13 with the higher feature scores are selected while the other half of the blocks B3, B7, B11, B15 are discarded (step 656). The freed-up memory is then used to input the portions of the next four (2p) rows (Rows 4-7) of the strip 412 that correspond with the currently selected blocks B1, B5, B9, B13 in the line buffer 602 (step 652). The resulting blocks B1, B5, B9, B13 are 16×8 blocks organized within line buffer 602 in sets of four 16×2 blocks (step 654). Once again, a feature analysis is performed on the 16×8 blocks B1, B5, B9, B13, and the half of the blocks B1, B9 with the higher feature score are selected while the other half of the blocks B5, B13 are discarded (step 656). Portions of the remaining eight rows (Rows 8-15) of the strip 412 that correspond to the selected blocks B1, B9 are input into the line buffer 602 (step 652). The line buffer 602 then includes 16×16 blocks B1, B9, organized in sets of eight 16×2 blocks. These 16×16 blocks B1, B9 are the most likely blocks in the strip to be corner blocks. The 16×16 blocks B1, B9 are used in motion matching, as explained above. A block motion vector is calculated for each selected block B1, B9. After the matching and determination of block vectors, a strip vector is calculated using either the block motion vector average or the median method, as described above.

Although advantageous and novel, a drawback of the above-described method 600 is that the method requires either memory shuffling to free up the discarded blocks and store new input lines, or memory management to track the memory locations of the freed-up blocks. To remedy this, the following block re-ordering approach 700 for populating the line buffer memory 602 is used to minimize memory shuffling or management.

In the block re-ordering approach 700, as illustrated in FIGS. 7A-7D, two pixel rows (Rows A and B) from a pixel array are initially input into the line buffer 602 (step 710). The input pixel rows A and B are not from the strip 412 being analyzed, but are instead located adjacent the strip 412, either directly above or below the strip 412. The purpose of using these two adjacent rows A and B is to pre-seed the line buffer 602. The two rows A and B in the line buffer 602 are divided into 16×2 blocks B1-B16 (for strips with a strip height of 16) (step 712). The 16×2 blocks B1-B16 are scored using horizontal variance and then ranked according to their feature scores (step 714). The top half ranked blocks (e.g., B2, B4, B7, B9, B10, B13, B14, B16) are selected and re-ordered according to the play-off bracket illustrated in FIG. 7A (step 716), following the rules explained below. The bottom half ranked blocks (e.g., B1, B3, B5, B6, B8, B11, B12, B15) are discarded (step 716). As with typical single elimination sports play-offs, the highest ranking block is ordered next to the lowest ranking block. The second highest ranking block is ordered next to the second lowest ranking block. The third highest ranking block is paired next to the third lowest ranking block. Each block pair is ordered next to another block pair so that a block pair with a greater difference in rank is next to a block pair with a lesser difference in rank.

Figure 7A:
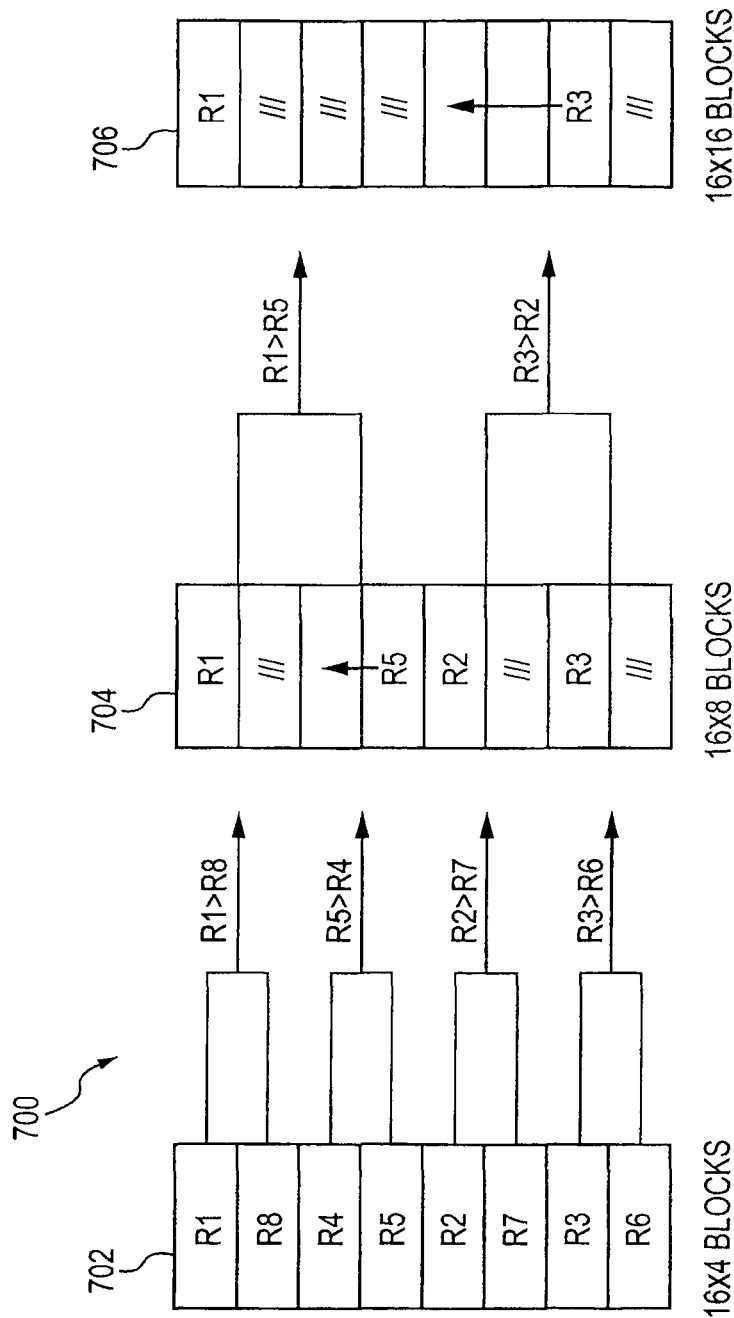
FIGS. 7A-7D illustrate an additional method of selecting pixel blocks according to a disclosed embodiment.
Figure 7B:
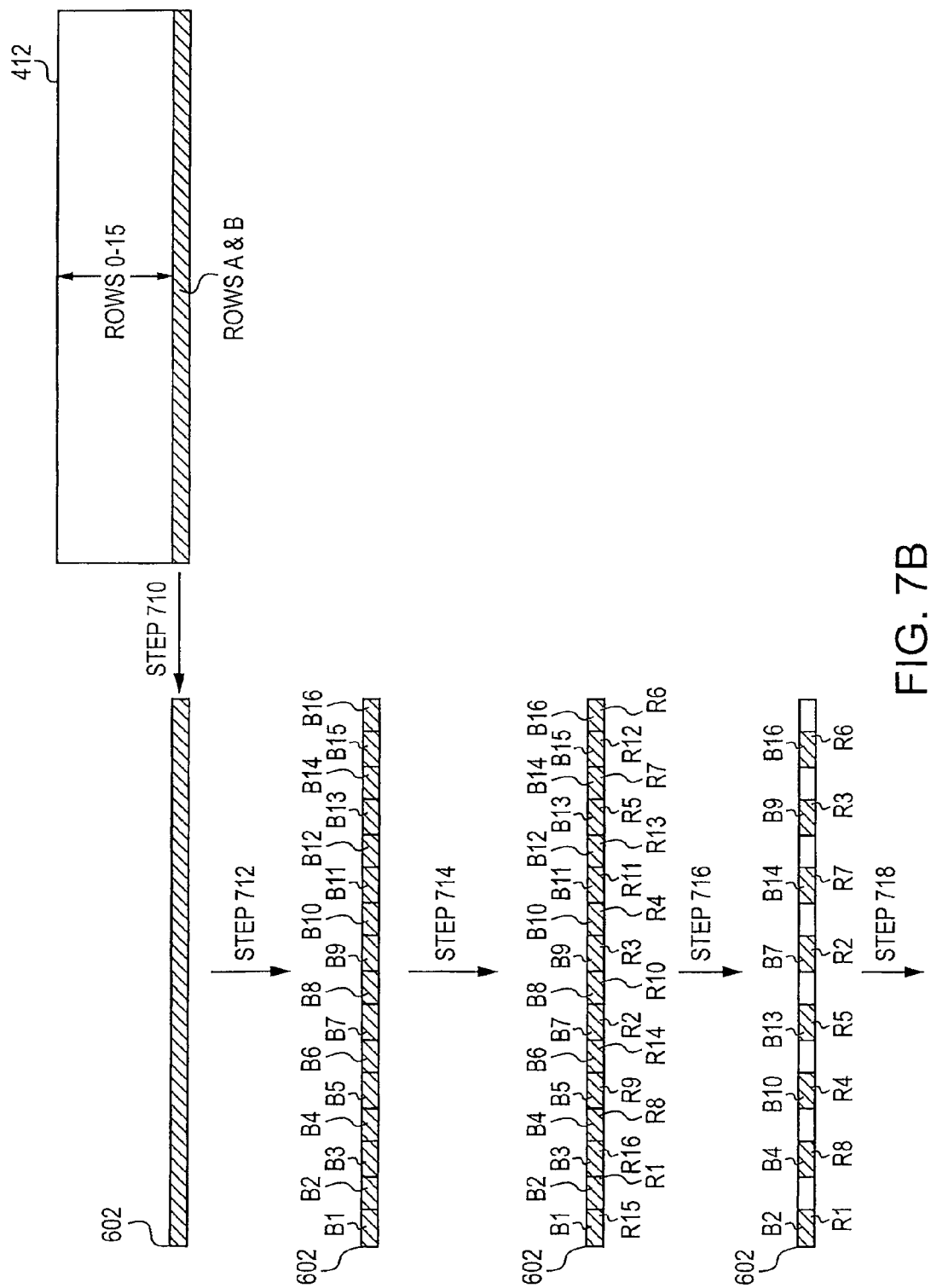
Figure 7C:
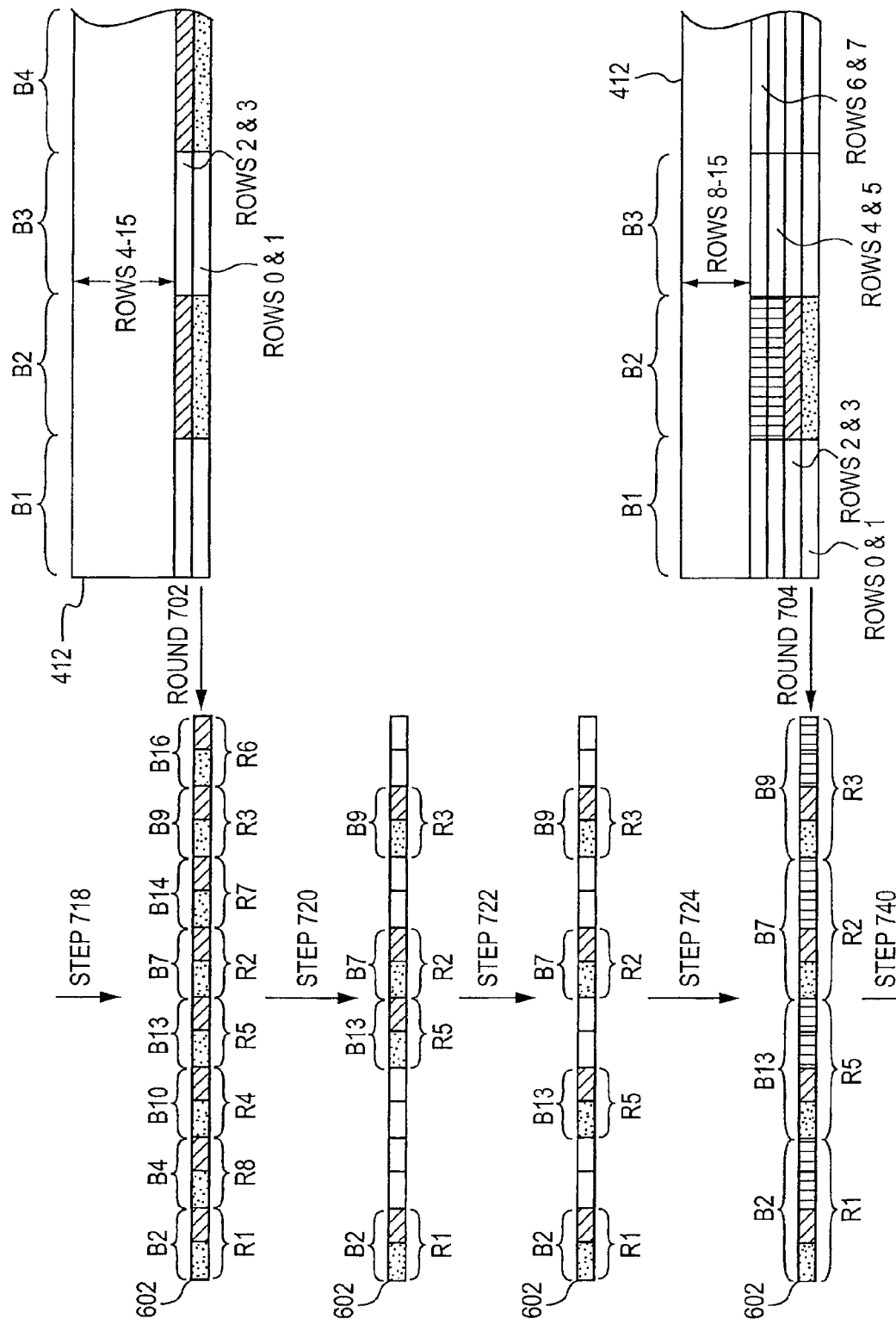
Figure 7D:
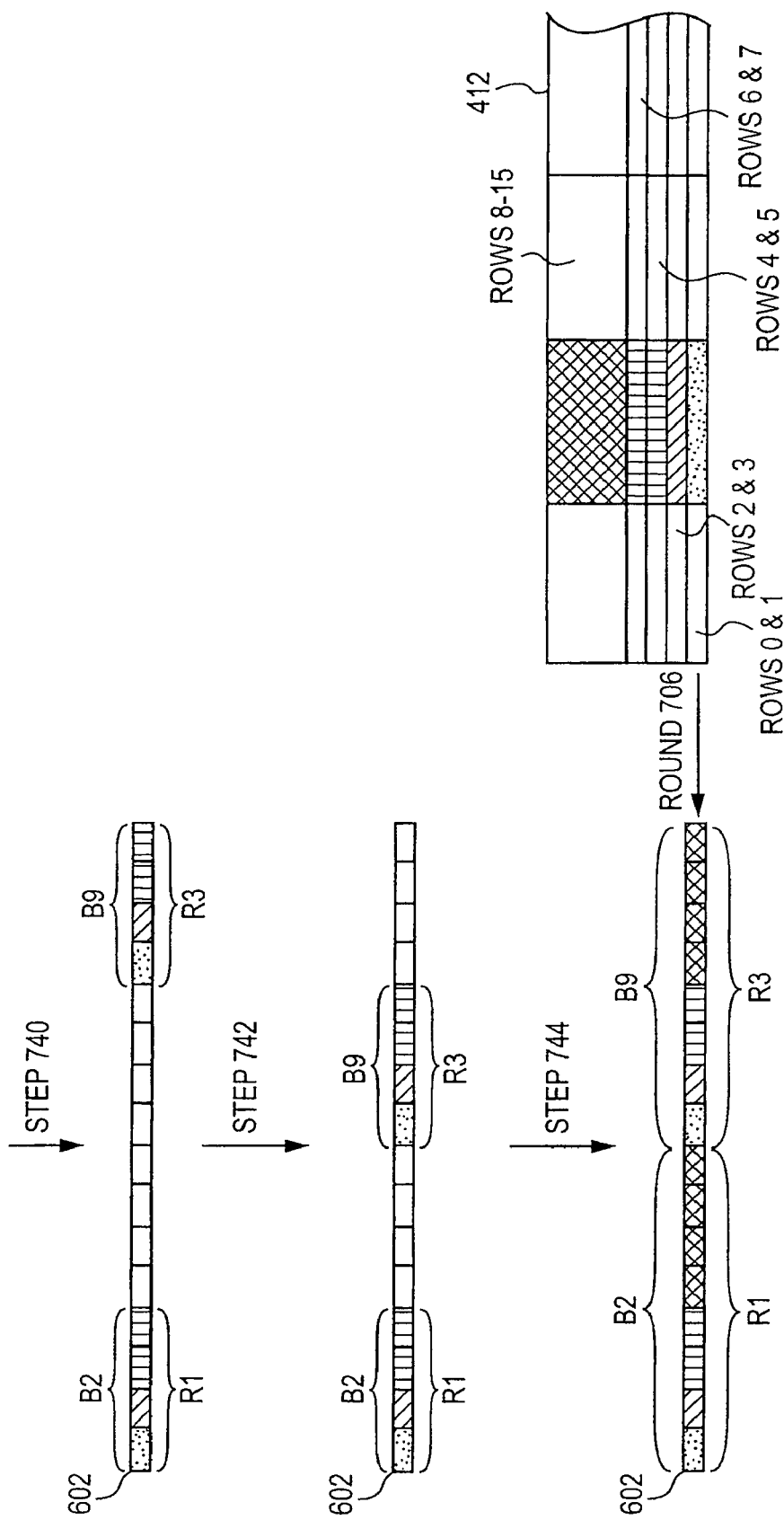

To accomplish this re-ordering, the following rules are used. The blocks with the two highest ranks R1, R2 are placed in two different halves of the line buffer. In the example of FIG. 7B, these are blocks B2 and B7, respectively. The blocks with the next two highest ranks R3, R4 (e.g., blocks B9, B10, respectively) are paired with the top two ranks R2, R1 (e.g., blocks B7, B2, respectively) in reverse order. The next four ranks R5, R6, R7, R8 (e.g., B13, B16, B14, B4, respectively) are paired with the top four ranks R4, R3, R2, R1 (e.g., B10, B9, B7, B2, respectively) in reverse order. The process continues until all the blocks are filled. The re-ordering favors the higher ranked blocks by pairing them with lower ranked blocks.

After the re-ordering of the selected blocks, the portions of the first four (n/4) rows (Rows 0-3) of the strip 412 that correspond to the selected blocks B2, B4, B7, B9, B10, B13, B14, B16 are written to the line buffer memory 602 in the new order (round 702 and step 718). New block features are calculated for these 16×4 blocks. The blocks are then pair-wise compared and the ones with higher scores move on to the next round (step 720). The losing blocks are discarded. If an upset occurs wherein a lower ranked block has a higher feature score than the higher ranked block, the lower ranked block is shuffled within the line buffer to replace its higher ranked counterpart (step 722). In this way, memory shifting only occurs if an upset occurs. For example, if the fifth-ranked block R5 (e.g., B13) had a higher feature score than the fourth-ranked block R4 (e.g., B10), the fourth-ranked block R4 (e.g., B10) would be discarded and the fifth-ranked block R5 (e.g., B13) would be shifted into the memory previously occupied by the fourth-ranked block R4 (e.g., B10).

In the next round (round 704), the portions of the next four rows (Rows 4-7) of the strip 412 that correspond to the winning blocks (e.g., B2, B7, B9, B13) are written to the line buffer 602 in their corresponding locations, thus obtaining 16×8 blocks organized into four sets of 16×2 blocks (step 724). Again, the blocks (e.g., B2, B7, B9, B13) are compared based on their feature score and the winners move on (step 740). As before, any upsets result in memory shuffling (step 742). For example, in FIGS. 7A and 7B, the third-ranked block R3 (e.g., B9) had a higher feature score than the second-ranked block R2 (e.g., B7), and so the second-ranked block R2 (e.g., B7) was discarded and the third-ranked block R3 (e.g., B9) was shifted into the memory previously occupied by the second-ranked block R2 (e.g., B7). In the end, full sized 16×16 blocks are obtained (round 706 and step 744).

Thus, by pre-seeding the potential winning blocks of the strip 412, the probabilities of an upset are decreased and thus memory shuffling is reduced. However, occasional memory shuffling is still required when an upset does occur.

Figure 12:
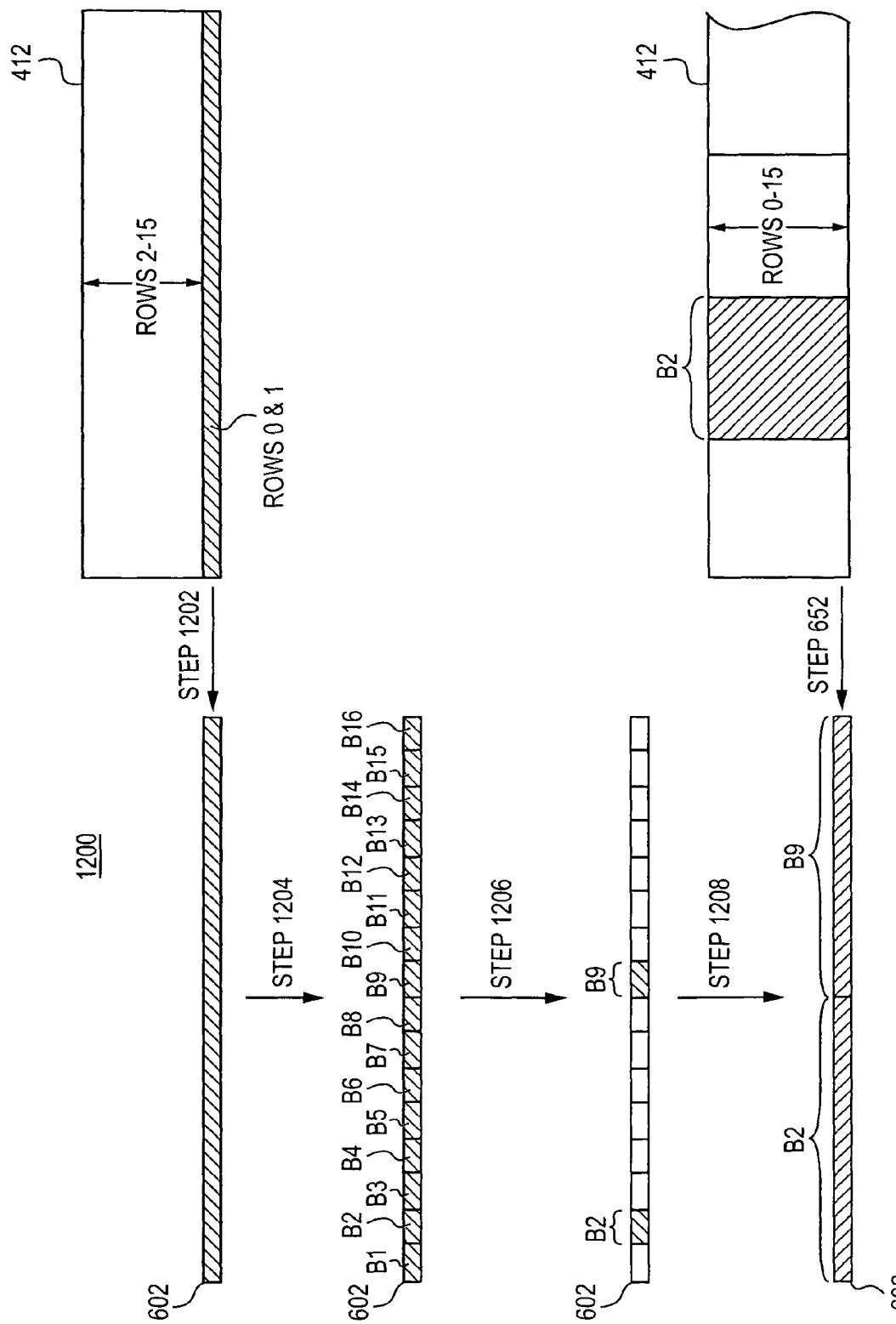
FIG. 12 illustrates an additional method of selecting pixel blocks according to a disclosed embodiment.

One method 1200 that completely eliminates memory shuffling is illustrated in FIG. 12. In method 1200, the first two rows (Rows 0 and 1) of a strip 412 are input to the line buffer 602 (step 1202). The line buffer 602 is divided into 16×2 blocks B1-B16, in the case of a strip 412 with sixteen rows (step 1204). The blocks B1-B16 are analyzed for horizontal variance. The blocks with the highest feature scores are retained (e.g., blocks B2, B9) while the rest are discarded (step 1206). For a strip with 16 rows, one out of every eight 16×2 blocks B1-B16 is selected. The line buffer 602 is then filled by only the selected 16×16 blocks (e.g., B2, B9) (step 1208). Block matching and motion vector determination then occurs as explained above. In this method, there is no need to repeatedly calculate and compare block features, nor shuffle memory. However, two line block portions provide very limited information about the feature strength for a complete block and are not the most accurate sources for determining corner blocks.

A second method for selecting blocks without shuffling memory is to use a pointer table. Instead of shuffling memory, the positions of each block portion is simply recorded in a table. Due to the overhead requirements of pointer tables, this second method is a good option when the block size is large (e.g., much larger than 8×8 or 16×16).

Figure 11:
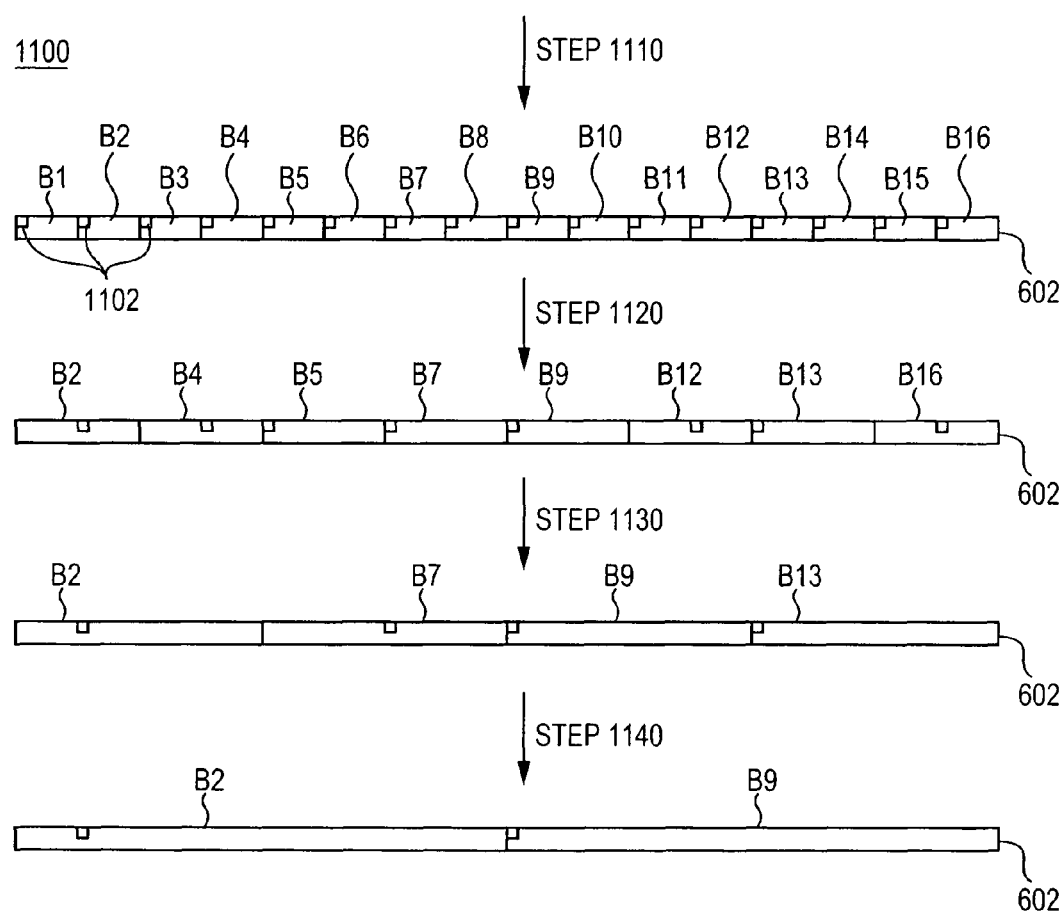
FIG. 11 illustrates a method of selecting pixel blocks according to a disclosed embodiment.

A third approach 1100 to select high-scoring blocks without shuffling memory, as illustrated in FIG. 11, is to load the line buffer 602 with the first two rows of a strip 412, divide the line buffer 602 into blocks B1-B16 (with a block size of 16×2, assuming a strip height of 16), and mark each block B1-B16 with a 1-bit identifier 1102 (step 1110). Feature scores for each of the blocks B1-B16 are calculated (using, for example, horizontal variance analysis), and the feature strength of each block B1-B16 is compared with a neighboring block. For each comparison, the 16×2 block with the higher feature strength is expanded to overwrite its lower strength neighbor (step 1120). The process of comparing neighboring blocks and expanding the higher-scoring block is repeated until the line buffer 602 only includes full 16×16 blocks (in sets of eight 16×2 blocks) (steps 1130, 1140). Each selected block is tracked using its 1 bit identifier 1102. When a lower-scoring block is overwritten, its identifier 1102 is also overwritten (steps 1120, 1130, 1140). Thus, after all comparisons have been made, only identifiers 1102 for the selected blocks (e.g., B2, B9) remain in the line buffer 602. In this way, no memory rearrangement or shuffling is needed. The disadvantage, however, of this approach is that very strong blocks (blocks with strong feature scores) may overwrite moderately strong blocks instead of overwriting the weakest blocks. Despite this disadvantage, the resulting set of selected blocks will still represent most of the corner blocks, and the reduced complexity and memory requirements are an overwhelming advantage.

In the event that no corner blocks are found (e.g., the selected blocks have feature scores that are less than a predetermined threshold), a gyro may be used to assist in the motion estimation phase. In the past, gyros have played limited roles due to their size and expense. However, as gyros become increasingly smaller and less expensive, manufacturers are beginning to incorporate gyros into higher-end digital cameras for use in image stabilization. In cameras, gyros are used to measure changes in panning and tilting angles, which correspond to x and y translations in an image.

To use a gyro in a video camera, one must first synchronize the gyro readouts and the camera sensor readouts. Gyro data can be read out at various frequencies. A typical gyro readout frequency is 1 kHz. A typical camera sensor readout is 30 frames per second ("fps"). Using a gyro with a 1 kHz readout and a camera with a 30 fps readout, one can obtain about 33 gyro samples per frame. A video graphics array ("VGA") video has 480 lines and a few vertical blanking lines. Thus, the gyro produces approximately one sample for every 16 lines. If the strip height is 16, the gyro produces a sample for every strip.

Also, in order for the gyro to measure the rotational angle of the camera, the gyro must be calibrated to output correct strip motion vectors based on the focal length of the camera. Rotational movement of a camera will result in different strip motion vectors for images captured using different focal lengths. For example, a five-degree rotational movement will have a different effect on an image that is very close to the camera and an image that is very far from the camera. In both instances, the gyro will measure a five-degree movement, but its output must be scaled according to the focal length of the image in order to provide an accurate strip motion vector for the image. Calibration need only be performed once per focal length. An optical zoom lens requires multiple calibrations for each applied focal length.

Strip motion vectors from a gyro can be combined with calculated motion vectors from selected blocks in each strip. A typical approach is to apply confidence measures to both sets of vectors and then determine a final strip motion vector as a weighted average of the sets of vectors, the weighted average being based on the confidence measures. The confidence measures may be determined experimentally and reflect the probability that the respective motion vector is accurate. The weighted average is determined by scaling each vector by its confidence measure, summing the scaled vectors, and then dividing the sum by the sum of the confidence measures.

Once strip motion vectors have been determined, row motion vectors may also be determined as explained above. The row motion vectors are used to adjust each row so that all rows in a rolling shutter camera appear to be captured at the same time. For convenience, the capture time of the middle row of each frame is used as the reference to which all other rows are mapped.

Figure 8:
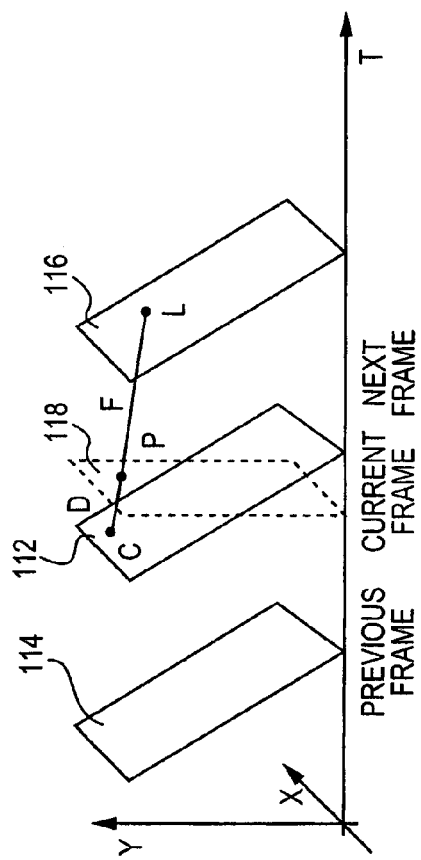
FIG. 8 illustrates a method of mapping a current video frame to a mapped video frame according to a disclosed embodiment.

In FIG. 8, the relationship between a current frame 112 and its mapped frame 118 (to which each row is mapped using the calculated row motion vectors) is illustrated. The mapped frame 118 is determined by interpolating between the current frame 112 and the previous and next frames 114, 116. For example, if there is no motion of any kind between a past frame 114, current frame 112 and a next frame 116, the current frame 112 and the mapped frame 118 are the same. If there is motion, each row, and hence each pixel in the current frame 112 is mapped by the estimated motion between the current frame 112 and the projected non-rolling shutter or mapped frame 118. If the pixel is in the top half of the current frame 112, its forward motion vector over the next frame 116 is used. If the pixel is in the bottom half of the current frame 112, its backward motion vector over the previous frame 114 is used. The top half of the mapped frame 118 falls in between the current frame 112 and the next frame 116. The bottom half of the mapped frame 118 falls in between the current frame 112 and the previous frame 114.

The motion between the current frame 112 and the mapped frame 118 is calculated by scaling the pixel motion vector. For example, the position C of a pixel in the current frame can be matched with a position L in the next frame 116 by using the pixel's motion vector (as determined by the row motion vector for the current row in which the pixel is located). By drawing a line CL between the two points, the intersection between the line CL and the mapped frame 118 becomes the location P of the pixel in the mapped frame 118. The intersection location P can be calculated by scaling the motion vectors with a ratio of d/f, as illustrated in FIG. 8, where d is the distance between the current frame location C and the mapped frame location P (i.e., the length of line CP in FIG. 8) and f is the distance between the next frame location L and the mapped frame location P (i.e., the length of line PL in FIG. 8). The mapped frame 118 removes rolling shutter artifacts and displays how the image would look had a non-rolling shutter camera been used to capture the image.

Figure 13A:
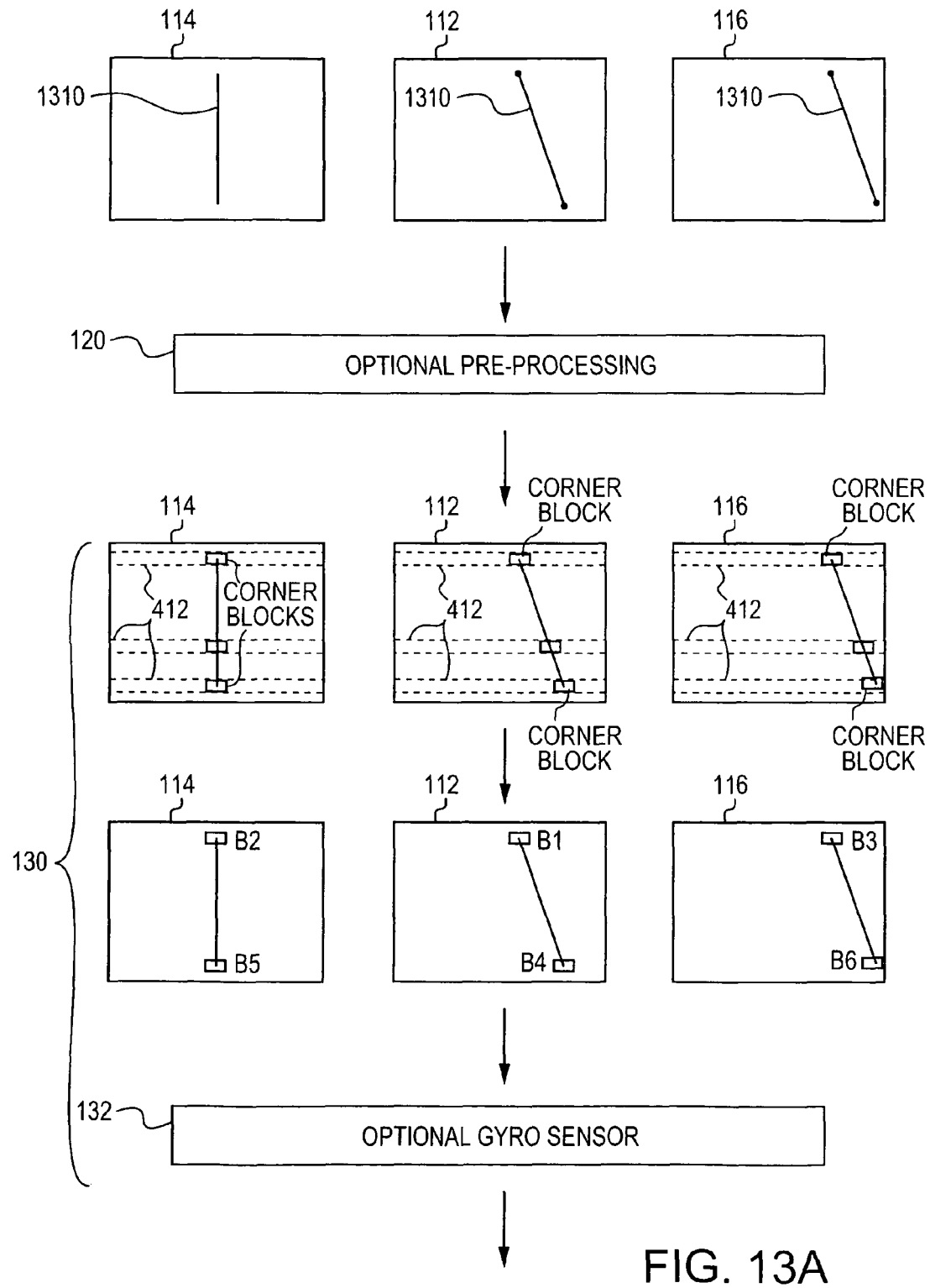
FIG. 13 illustrates an example application of system 100 to a pixel frame.
Figure 13B:
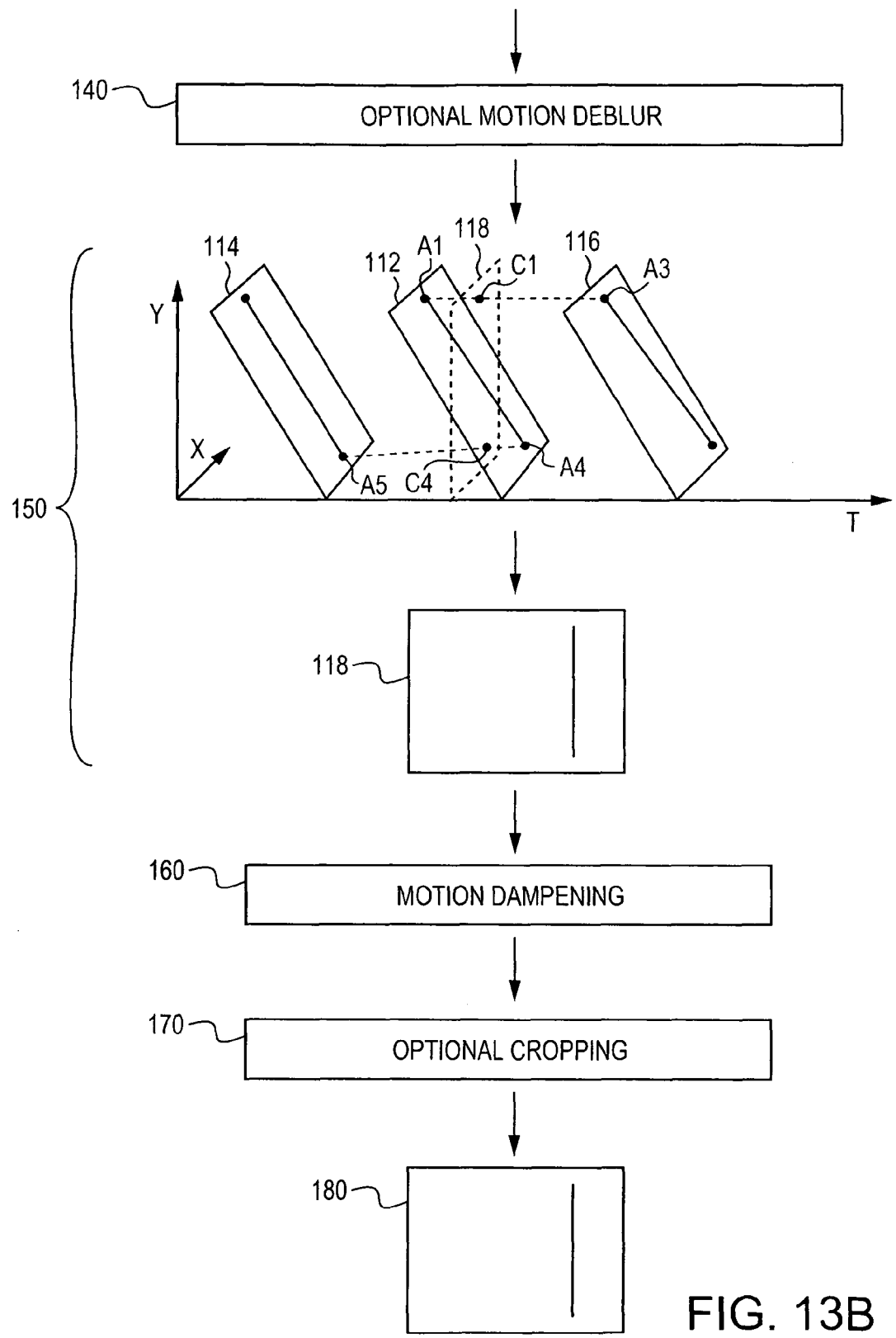

FIGS. 13A and 13B illustrate an example result of using the stabilization system 100, as explained above. In FIG. 13A, a vertical bar 1310 is imaged. The bar 1310 is captured in a previous frame 114, a current frame 112 and a next frame 116. In the previous frame 114, the vertical bar 1310 is stably imaged. However, in the current frame 112 and the next frame 116, either the bar 1310 is being moved to the right or the camera is moving to the left. The uncompensated rolling shutter makes the lower portion of the bar 1310 appear to move faster than the upper portion. In order to compensate for the rolling shutter, optional pre-processing 120 occurs, as explained above, and then the motion of the bar or camera is estimated in the motion estimation step 130. Motion estimation 130 is the identification of pixel motion vectors for each pixel in the current frame 112. Because sampling of the current frame 112 is done on a row-by-row basis, the motion vectors for each pixel are equal to the motion vectors of the pixel row in which the pixel is located. Row motion vectors are determined by using strips 412 and calculating corresponding strip motion vectors, and then either averaging or interpolating the values of individual row motion vectors from the calculated strip motion vectors.

Strip motion vectors are calculated by applying strips 412 to the previous frame 114, current frame 112 and next frame 116. From each strip 412, corner blocks or blocks with high feature scores are determined. The corner blocks are determined using the two-line buffer memory 602 and the methods described above and illustrated in FIGS. 6A, 6B, 7A, 7B, 11 and 12. Once corner blocks or high feature scoring blocks for each strip 412 are determined, block matching is performed. Corner blocks in the current frame 112 are matched via feature scores with blocks in the previous frame 114 and the next frame 116. For example, block B1 of the current frame 112, representing the upper terminus of the bar 1310 is matched with block B2 in the previous frame 114 and block B3 in the next frame 116. Similarly, block B4 of the current frame 112, representing the lower terminus of the bar 1310, is matched with block B5 of the previous frame 114 and block B6 of the next frame 116. When a match is found, a block motion vector may be calculated, describing the motion of the block. As described above, the block motion vectors of multiple blocks within a strip are used to determine a strip motion vector, which is then averaged or interpolated to determine a row motion vector and, equivalently, pixel motion vectors. In this way, pixel motion vectors for each pixel in the current frame 112 may be calculated. As explained above, a gyro may also be used to assist in the calculation of strip, row and pixel motion vectors (step 132).

Once the pixel motion vectors have been calculated, optional motion deblur 140 and rolling shutter artifact removal 150 may occur (FIG. 13B). A reference time is selected as a sampling time to which all pixels in the current frame 112 are mapped. Generally, the reference time is the time at which the middle row of the current frame 112 is sampled. Using the calculated pixel motion vectors, a line is determined that connects each pixel in the current frame 112 with the corresponding pixel in the previous frame 114 and next frame 116. The location of the pixels in the mapped frame 118 (defined by the reference time) is at the intersection of these lines with the mapped frame 118. For example, using the pixel motion vector for pixel A1 in the current frame 112, a line is determined from pixel A1 to pixel A3 in the next frame 116. The intersection of this line with the mapped frame 118 is at pixel C1. Similarly, using the pixel motion vector for pixel A4 in the current frame 112, a line is determined from pixel A4 to pixel A5 in the previous frame 114. The intersection of this line with the mapped frame 118 is at pixel C4. The mapped frame 118 thus represents the rolling shutter-compensated current frame 112.

Motion dampening 160, such as a high-frequency filter, as explained above, is applied to the mapped frame 118. Optional cropping 170 may also be applied. The resulting output frame 180 is motion stabilized and has no or significantly reduced rolling shutter artifacts.

Figure 9:
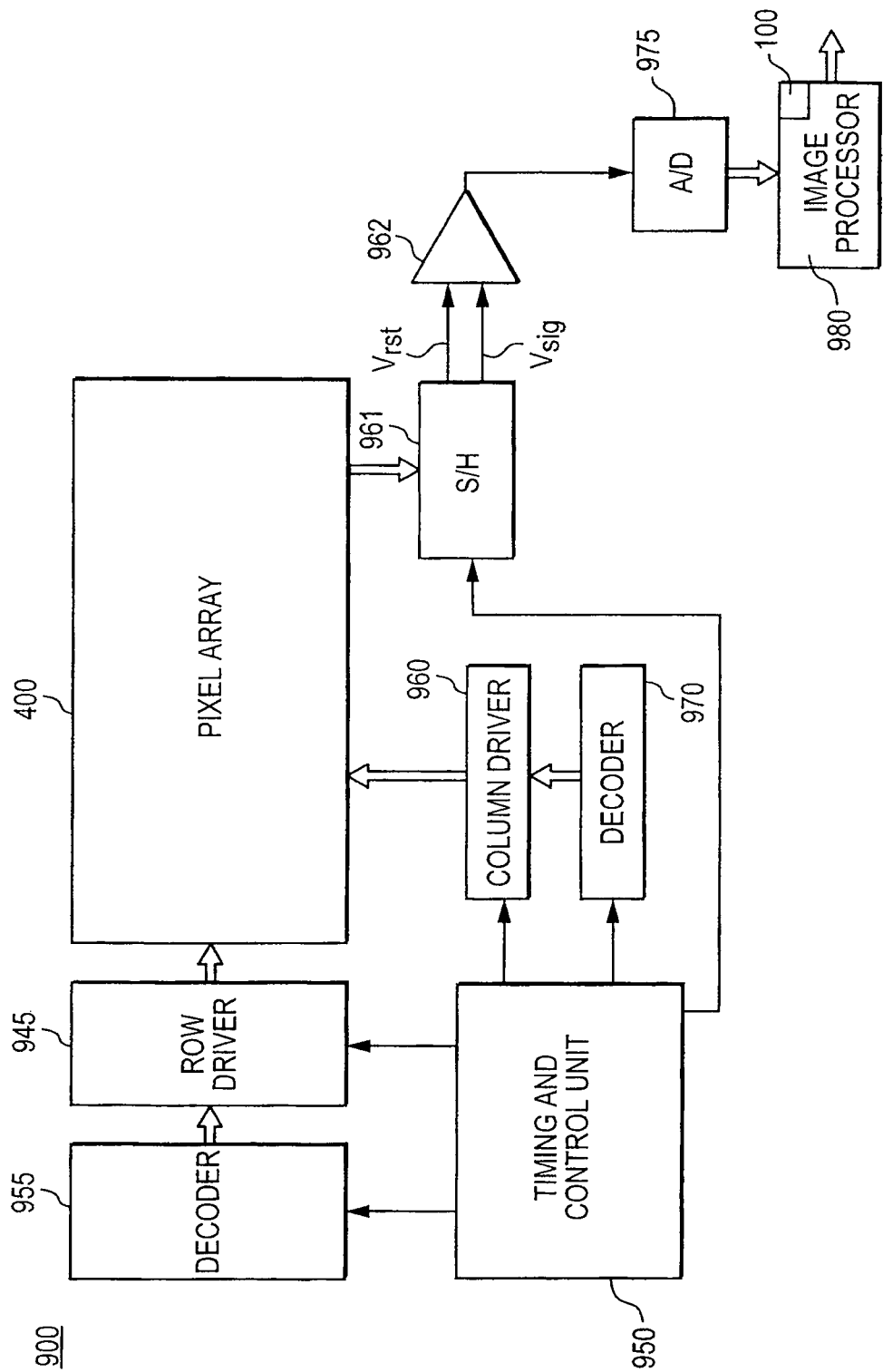
FIG. 9 is a block diagram of an imager according to a disclosed embodiment.

The stabilization system 100, as described above, may be implemented using either hardware or software or via a combination of hardware and software. For example, in a semiconductor CMOS imager 900, as illustrated in FIG. 9, the system 100 may be implemented within an image processor 980. FIG. 9 illustrates a simplified block diagram of a semiconductor CMOS imager 900 having a pixel array 400 including a plurality of pixel cells arranged in a predetermined number of columns and rows. Each pixel cell is configured to receive incident photons and to convert the incident photons into electrical signals. Pixel cells of pixel array 940 are output row-by-row as activated by a row driver 945 in response to a row address decoder 955. Column driver 960 and column address decoder 970 are also used to selectively activate individual pixel columns. A timing and control circuit 950 controls address decoders 955, 970 for selecting the appropriate row and column lines for pixel readout. The control circuit 950 also controls the row and column driver circuitry 945, 960 such that driving voltages may be applied. Each pixel cell generally outputs both a pixel reset signal $v_{rst}$ and a pixel image signal $v_{sig}$, which are read by a sample and hold circuit 961 according to a correlated double sampling ("CDS") scheme. The pixel reset signal $v_{rst}$ represents a reset state of a pixel cell. The pixel image signal $v_{sig}$ represents the amount of charge generated by the photosensor in the pixel cell in response to applied light during an integration period. The pixel reset and image signals $v_{rst}$, $v_{sig}$ are sampled, held and amplified by the sample and hold circuit 961. The sample and hold circuit 961 outputs amplified pixel reset and image signals $V_{rst}$, $V_{sig}$. The difference between $V_{sig}$ and $V_{rst}$ represents the actual pixel cell output with common-mode noise eliminated. The differential signal (e.g., $V_{rst}$–$V_{sig}$) is produced by differential amplifier 962 for each readout pixel cell. The differential signals are digitized by an analog-to-digital converter 975. The analog-to-digital converter 975 supplies the digitized pixel signals to an image processor 980, which forms and outputs a digital image from the pixel values. The output digital image is the mapped and corrected image resulting from the stabilization system 100 of the or at least controlled by the image processor 980.

Figure 10:
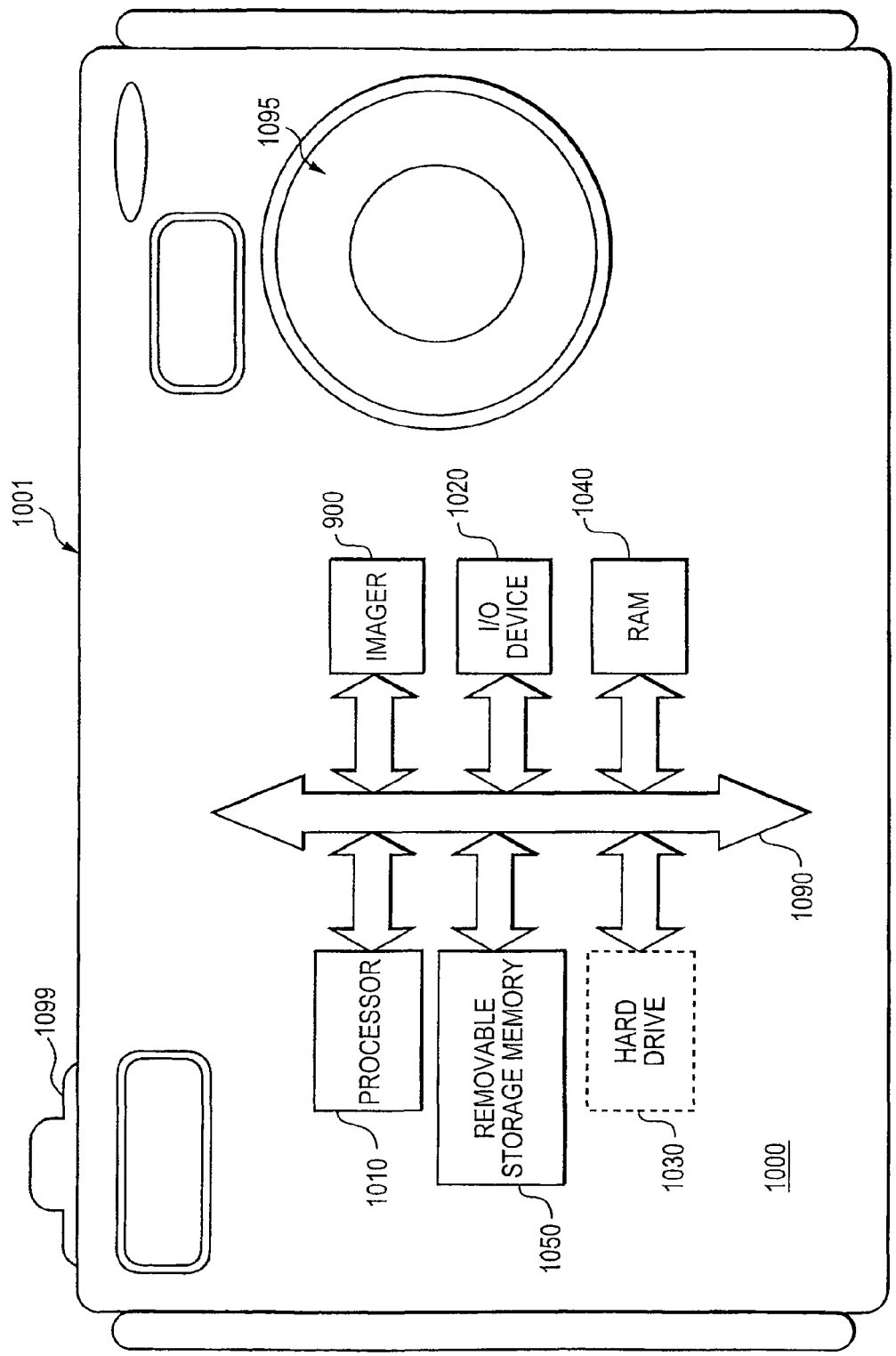
FIG. 10 is a block diagram of an imaging processing system according to a disclosed embodiment.

The system 100 may be used in any system which employs a moving image or video imager device, including, but not limited to a computer system, camera system, scanner, machine vision, vehicle navigation, video phone, surveillance system, auto focus system, star tracker system, motion detection system, image stabilization system, and other imaging systems. Example digital camera systems in which the invention may be used include video digital cameras, still cameras with video options, cell-phone cameras, handheld personal digital assistant (PDA) cameras, and other types of cameras. FIG. 10 shows a typical processor system 1000 which is part of a digital camera 1001. The processor system 1000 includes an imaging device 900 which includes either software or hardware to implement video stabilization in accordance with the embodiments described above. System 1000 generally comprises a processing unit 1010, such as a microprocessor, that controls system functions and which communicates with an input/output (I/O) device 1020 over a bus 1090. Imaging device 900 also communicates with the processing unit 1010 over the bus 1090. The processor system 1000 also includes random access memory (RAM) 1040, and can include removable storage memory 1050, such as flash memory, which also communicates with the processing unit 1010 over the bus 1090. Lens 1095 focuses an image on a pixel array of the imaging device 900 when shutter release button 1099 is pressed.

The processor system 1000 could alternatively be part of a larger processing system, such as a computer. Through the bus 1090, the processor system 1000 illustratively communicates with other computer components, including but not limited to, a hard drive 1030 and one or more removable storage memory 1050. The imaging device 900 may be combined with a processor, such as a central processing unit, digital signal processor, or microprocessor, with or without memory storage on a single integrated circuit or on a different chip than the processor.

It should again be noted that although the embodiments have been described with specific reference to CMOS imaging devices, they have broader applicability and may be used in any imaging apparatus which generates pixel output values, including charge-coupled devices CCDs and other imaging devices.

What is claimed as new and desired to be protected by Letters Patent of the United States is:

1. A method of determining row motion vectors for each row in a current frame of a pixel array, the method comprising:
   dividing the current frame into strips, each strip including a plurality of rows;
   identifying blocks of pixels within each strip;
   determining block motion vectors for each block;

using the block motion vectors for each block to determine a strip motion vector for each strip; and using the strip motion vectors to determine the row motion vectors.

2. The method of claim 1, wherein block motion vectors are only determined for a portion of the blocks that have distinguishing features that are able to be matched with blocks from previous and/or subsequent frames.

3. The method of claim 1, wherein a strip motion vector is determined by averaging the block motion vectors for the strip.

4. The method of claim 1, wherein a strip motion vector is determined by finding a median block motion vector of the block motion vectors for the strip and then averaging a portion of the block motion vectors that are closest to the median block motion vector.

5. The method of claim 1, wherein a middle row of a strip is assigned a row motion vector equal to the strip motion vector of the strip, and wherein row motion vectors for the remaining rows of the strip are interpolated from strip motion vectors of neighboring strips.

6. A method of selecting pixel blocks for motion estimation from a strip of n pixel rows using only two rows of memory, wherein n is any power of two greater than zero, the method comprising:

inputting the first two rows of the strip into the memory;

dividing the memory into two-by-n pixel blocks;

determining a feature score for each block;

selecting half of the blocks with a feature score greater than determined for the other half of the blocks;

discarding the unselected blocks;

filling the available memory with portions of additional rows in the strip that correspond to the selected blocks; and repeating the determining, the selecting, the discarding and the filling steps until the memory contains n-by-n blocks.

7. The method of claim 6, further comprising pre-seeding the locations of the two-by-n pixel blocks by ranking the two-by-n pixel blocks based on feature scores of neighboring pixel blocks and organizing the two-by-n pixel blocks so that higher-ranked pixel blocks are paired, single-elimination tournament style, with lower-ranked pixel blocks.

8. The method of claim 7, wherein the selecting step includes comparing the feature scores of the pixel block in each pair and selecting one block of each pair.

9. The method of claim 8, wherein if a lower-ranked block is selected over a higher-ranked block, the contents of the lower-ranked block are shuffled into the location of the unselected higher-ranked block.

10. The method of claim 6, wherein the selecting step includes comparing the feature scores of neighboring pairs of pixel blocks and selecting one block of each pair.

* * * * *